Patented Nov. 10, 1925.

1,561,261

UNITED STATES PATENT OFFICE.

ALFRED GEORGE MARSHALL, OF PURLEY, ENGLAND.

LUBRICATING COMPOUND AND ITS MANUFACTURE.

No Drawing.   Application filed July 17, 1923.   Serial No. 652,182.

*To all whom it may concern:*

Be it known that I, ALFRED GEORGE MARSHALL, a subject of the King of Great Britain, residing at Purley, in the county of Surrey, England, have invented Improved Lubricating Compounds and Their Manufacture, of which the following is a specification.

This invention relates to improved lubricating compounds formed by solutions of mineral oils with non-mineral oils that are imperfectly soluble therein, and a process for their manufacture.

According to this invention by the treatment of a suitable non-mineral oil with a suitable mineral oil, two solutions are obtained, one consisting of a mineral oil from which the constituents the more soluble in the non-mineral oil have been removed, together with a portion of the non-mineral oil, while the other solution consists of non-mineral oil and certain constituents of the mineral oil.

It has been found that the non-mineral oil contains more mineral oil than can be taken up when a non-mineral oil is merely blended with a mineral oil; the product obtained with the employment of a suitable non-mineral oil is more especially suitable for lubricating internal combustion engines.

The mineral oil is also suitable for lubricating internal combustion engines or preparing mixtures for this purpose; the oil is of improved quality due to the withdrawal of certain constituents of the original mineral oil.

The process consists in intimately mixing the oils together or dissolving the non-mineral oil in the mineral oil and then allowing a separation to take place. The mixing together of the oils may take place in any manner adapted to produce an intimate mixture or solution of the two types of oil.

The selection and proportions of the oils must be such that after intimate mixture or solution a separation of the oils takes place on standing or cooling, should heat have been applied to cause solution.

As an example 12 parts by weight of a mineral oil of viscosity 600 Saybolt at 100° F., and 7 parts by weight of castor oil are mixed and heated with stirring until perfect solution occurs (about 60° C.). The mixture is then allowed to cool to 20° C. and to stand at that temperature until separation is complete. The oil separates into two layers with "foots" concentrated at the interface. The lower layer is then drawn off and may be used as it is but preferably two thirds of its weight of castor oil is added so that if the final mixture becomes chilled to 0° C. a further separation does not take place. An intermediate portion containing the "foots" is then drawn off separately. The remaining or upper layer is chilled to 0° C., allowed to stand so that it separates into layers, and the top layer thereof is separated off so that a solution is obtained which remains clear at temperatures down to 0° C.

The composition of the oils produced will be varied by altering the temperature at which the separation takes place; the lower the temperature of separation the less will be the proportion of the minority constituent in either layer.

The composition of the oils produced will also be varied by varying the proportions of the mineral and the non-mineral oil for if the proportion of the mineral oil is increased the proportion of non-mineral oil which becomes dissolved in it tends to be diminished but the proportion of mineral oil in the non-mineral oil is increased.

What I claim is:—

1. The process of manufacturing a lubricating compound which comprises heating and mixing together castor oil and a mineral oil until solution takes place, allowing the solution to cool until a separation into layers is complete, drawing off the lower layer and adding to the latter such further quantity of castor oil as will on cooling to 0° C. prevent a further separation taking place.

2. The process of manufacturing a lubricating compound, which comprises mixing together a mineral oil and castor oil, heating the mixture until solution takes place, allowing the mixture to cool and to separate into layers, drawing off the upper layer, cooling it to about 0° C. so that it again separates into layers and drawing off the upper layer to obtain a solution which remains clear at temperatures down to 0° C.

3. The process of manufacturing lubricating compounds, which comprises mixing together a mineral oil and castor oil, heating the mixture until solution takes place, allowing the mixture to cool and to separate into layers, drawing off the layers separately, adding to the lower layer a quantity of castor oil to prevent further separation in cooling to 0° C., cooling said upper layer to about 0° C. so that it again separates into layers and drawing off the upper layer thereof to obtain a solution which remains clear at temperatures down to 0° C.

4. A lubricating compound comprising a mixture of mineral oil and castor oil in which the castor oil predominates obtained by mixing together mineral oil and castor oil, allowing the mixture to stand until it separates into layers and drawing off the lower layer separately.

In testimony that I claim the foregoing as my invention I have signed my name this 20th day of June 1923.

ALFRED GEORGE MARSHALL.